United States Patent
Merrick

(10) Patent No.: US 7,112,299 B2
(45) Date of Patent: Sep. 26, 2006

(54) SYSTEMS AND METHODS FOR FABRICATING COMPOSITE FIBERGLASS LAMINATE ARTICLES

(76) Inventor: Michael Merrick, 8900 Rancho Hills Dr., Gilroy, CA (US) 95020

( * ) Notice: Subject to any disclaimer, the term of this patent is extended or adjusted under 35 U.S.C. 154(b) by 0 days.

(21) Appl. No.: 10/617,164

(22) Filed: Jul. 9, 2003

(65) Prior Publication Data

US 2005/0006823 A1    Jan. 13, 2005

(51) Int. Cl.
B29C 70/44    (2006.01)

(52) U.S. Cl. ............ 264/510; 264/102; 264/257; 264/258; 264/324; 264/511; 264/571; 156/245; 156/286

(58) Field of Classification Search ............ 264/102, 264/510–511, 324, 571; 156/245, 286
See application file for complete search history.

(56) References Cited

U.S. PATENT DOCUMENTS

| | | | |
|---|---|---|---|
| 2,412,455 A | 12/1946 | Hall, Jr. | |
| 3,282,761 A | 11/1966 | Evangelist | |
| 3,372,408 A | 3/1968 | Luger et al. | |
| 3,811,141 A | 5/1974 | Stoeberl | |
| 3,887,952 A | 6/1975 | Nicoll, Jr. | |
| 4,021,874 A | 5/1977 | Alter et al. | |
| 4,052,241 A | 10/1977 | Walter | |
| 4,094,027 A | 6/1978 | Vernon | |
| 4,118,814 A | 10/1978 | Holtom | |
| 4,267,147 A * | 5/1981 | Pogoda et al. ............ | 264/571 |
| 4,453,357 A | 6/1984 | Zwilgmeyer | |
| 4,471,710 A | 9/1984 | Brown | |
| 4,620,890 A | 11/1986 | Myers et al. | |
| 4,622,091 A | 11/1986 | Letterman | |
| 4,676,853 A | 6/1987 | Lerma | |
| 4,882,118 A | 11/1989 | Megarry | |
| 5,266,249 A * | 11/1993 | Grimes, III et al. ....... | 264/45.2 |
| 5,368,807 A | 11/1994 | Lindsay | |
| 5,433,165 A * | 7/1995 | McGuiness et al. ........ | 114/357 |
| 5,635,013 A | 6/1997 | Boi | |
| 5,741,574 A * | 4/1998 | Boyce et al. ............... | 428/119 |
| 5,875,732 A | 3/1999 | Chapman et al. | |
| 5,939,007 A | 8/1999 | Iszczyszyn et al. | |
| 6,017,484 A | 1/2000 | Hale | |
| 6,168,358 B1 | 1/2001 | Engwall et al. | |
| 6,540,954 B1 | 4/2003 | Kramers | |

(Continued)

OTHER PUBLICATIONS

Airtech Advanced Materials Group; data sheet/catalog; Dec. 21, 1998; pp. 6 & 8.

(Continued)

*Primary Examiner*—Stefan Staicovici
(74) *Attorney, Agent, or Firm*—Michael R. Schacht; Schacht Law Office, Inc.

(57) ABSTRACT

A method of fabricating laminate articles. A plurality of support templates are arranged to define a part outline corresponding to the laminate article. An outer surface of a primary panel to is secured to the plurality of templates. A secondary panel is arranged in a desired relationship with the primary panel. A vacuum bag is secured to the primary panel to define a vacuum chamber. A vacuum is applied to the vacuum chamber to remove air from between the at least one primary panel and the at least one secondary panel. Optionally, at least one locater peg may be secured to the primary panel and at least one locater hole may be formed in the secondary panel. In this case, the secondary panel is displaced relative to the primary panel such that the at least one locater peg enters the at least one locater hole.

34 Claims, 7 Drawing Sheets

U.S. PATENT DOCUMENTS 6,708,642 B1 * 3/2004 Taylor ..................... 114/290

OTHER PUBLICATIONS

Andre Cocquyt; "Infusion Revisited"; *Professional BoatBuilder;* Feb./Mar. 2001; pp. 132-155.

Bruce Pfund; "Tools of the Trade-Duflex"; *Professional BoatBuilder;* Feb./Mar. 2000; pp. 162-168.

Trevor Gundberg; "What is Vacuum Infusion"; *Vacuum Infusion Processing with DIAB Core* Materials Guide—DIAB Company Technical Bulletin pp. 1-9.

* cited by examiner

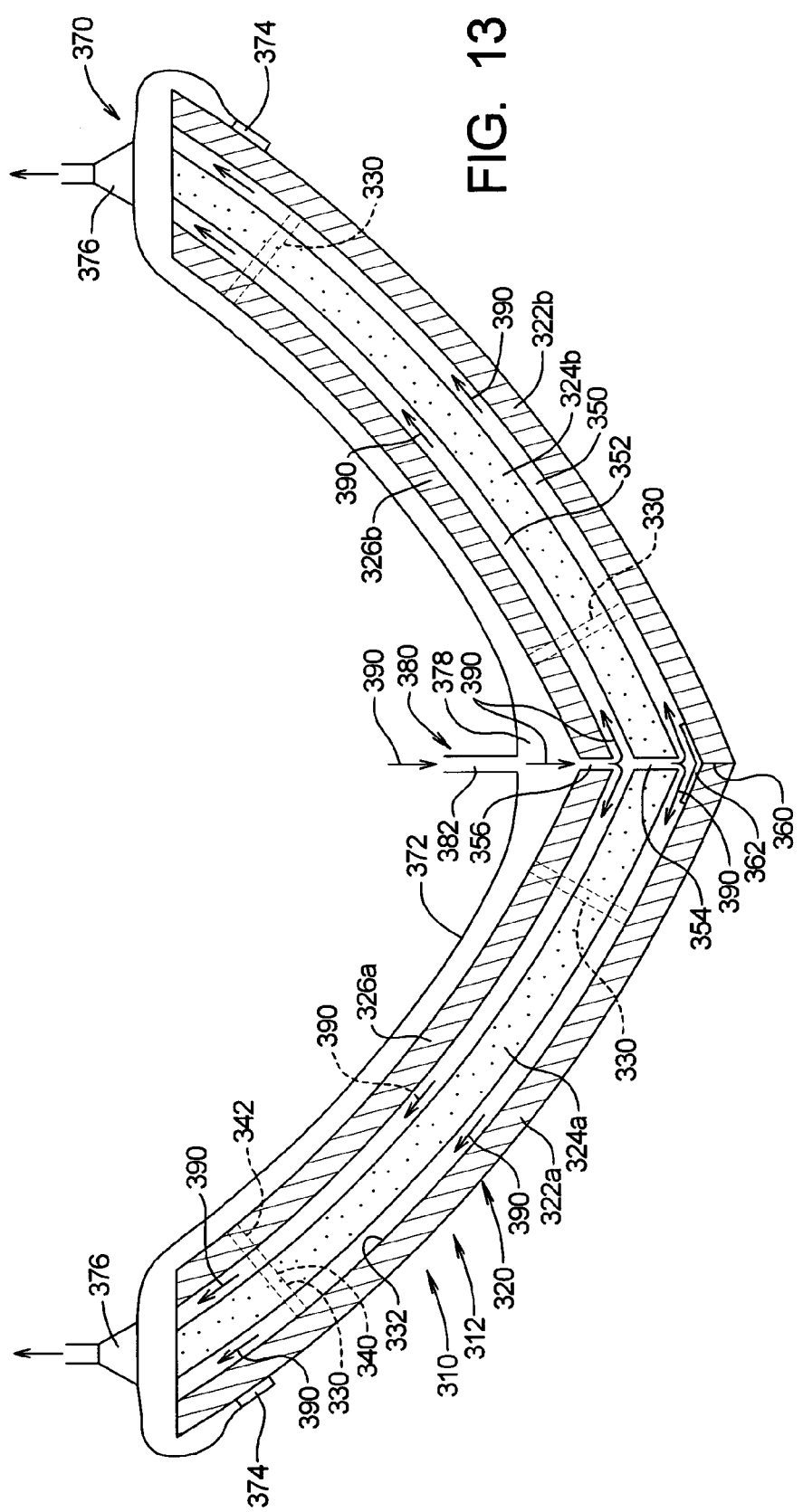

SYSTEMS AND METHODS FOR FABRICATING COMPOSITE FIBERGLASS LAMINATE ARTICLES

FIELD OF THE INVENTION

The present invention relates to systems and methods for fabricating fiberglass articles and, more particularly, to such systems and methods that allow composite fiberglass laminate articles to be fabricated without the use of a mold.

BACKGROUND OF THE INVENTION

The term "fiberglass" is commonly used to refer to a relatively rigid, strong, and lightweight inert plastic material that combines a plastic matrix with a fabric of glass filaments or fibers. An article made of fiberglass material will be referred to herein as a "fiberglass article". The fabric of filaments or fibers will be referred to herein as "reinforcement fabric". The plastic matrix is formed by a solidified mixture of resin and hardener. In the following discussion, the mixture of resin and hardener will be referred to simply as resin when in liquid form.

Fiberglass articles are typically fabricated by laying a mat of reinforcement fabric, saturating the mat with resin, and allowing the resin and reinforcement fabric to harden. When the resin and reinforcement fabric harden, they bond chemically and mechanically to form a relatively rigid structure.

Fiberglass articles are typically produced using a mold. The creation of a mold for fiberglass materials is highly labor and/or capital intensive, and molds are thus relatively expensive to produce. Once a mold is created, alterations to the design of the fiberglass article require either a new mold or expensive and time consuming changes to an existing mold. The use of molds to fabricate fiberglass articles thus substantially increases the costs of the fiberglass article, especially when the mold costs cannot be amortized over a large number of products.

Fiberglass materials can be used alone or in conjunction with other materials to form a finished product. By itself, fiberglass material can be formed with a mold and then removed from the mold to obtain the finished article. The fiberglass material can also be combined with other materials in a variety of ways. For example, the fiberglass material can be applied to an underlying structure to protect and strengthen the underlying structure.

Layers of fiberglass materials may also be laminated together and/or in combination with other materials. For example, inner and outer layers of fiberglass material can be combined with a core of another type of material. The material formed by a plurality of layers of fiberglass material will be referred to herein as a "fiberglass laminate" material. The material formed by one or more layers of fiberglass material and a layer of another type of material will be referred to herein as a "composite fiberglass laminate" material. The present application is of particular significance when used to fabricate a fiberglass laminate article and/or a composite fiberglass laminate article.

The need exists for improved systems and methods for fabricating fiberglass articles, including fiberglass laminate articles and composite fiberglass laminate articles that allow, but do not require, the use of a mold.

SUMMARY OF THE INVENTION

The present invention may be embodied as systems for or method of fabricating laminate articles. At least one primary panel defining an inner surface is provided. At least one locater peg is also provided. The at least one locater peg is secured the primary panel. At least one secondary panel is also provided, and at least one locater hole is formed in the secondary panel. The secondary panel is displaced relative to the primary panel such that the at least one locater peg enters the at least one locater hole. A vacuum is applied between the primary panel and the secondary panel such that air is withdrawn from between the primary panel and the secondary panel and hardenable material is dispersed between the primary panel and the secondary panel.

BRIEF DESCRIPTION THE DRAWINGS

FIG. 13 is a somewhat schematic, end elevation, cut-away view of a fourth embodiment of the present invention.

DETAILED DESCRIPTION OF THE INVENTION

Figure 1A:
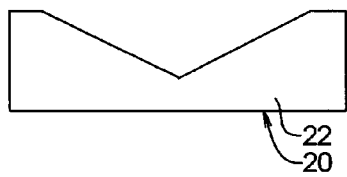
FIGS. 1A–1H are somewhat schematic, front elevation views depicting a first embodiment of a fabrication system of the present invention.

Referring initially to FIGS. 1A–H of the drawing, one example of a fabrication system 10 constructed in accordance with, and embodying, the principles of the present invention will now be described. As shown in FIGS. 1A–H, the fabrication system is used to form a three-layer, two-panel composite fiberglass laminate part 12 comprising a primary layer or outer skin 14 and a plurality of secondary layers including a core 16 and an inner layer or skin 18.

The terms "inner" and "outer" are used in this application to refer to the particular laminate part 12 being manufactured. In example described herein, the laminate part 12 is a boat hull, and the outer skin 14 forms the outer surface of the boat hull, while the inner skin 18 forms the inner surface of the boat hull. However, the fabrication system 10 may be used to fabricate other laminate parts, and the terms "inner" and "outer" are not intended to limit the scope of the present invention, especially in the context of parts other than boat hulls.

The exemplary outer and inner skin layers 14 and 18 are formed of a fiberglass material, while the exemplary core layer 16 is not. The exemplary laminate part 12 described herein is thus a composite laminate fiberglass article as generally described above. The exemplary core layer 16 may be made of any number of materials, including synthetic foams, wood, steel, fiberglass, or other material having desirable properties. The exemplary core layer 16 is made of a layer of synthetic foam that is typically sold in sheets.

While the exemplary composite laminate part 12 described herein comprises three layers, the principles of the present invention may also be applied to a fiberglass laminate article comprising two layers or a composite laminate fiberglass article comprising more than three layers. For example, some applications may not require an inner skin layer, and this layer may be omitted. In other parts, only the outer and inner skins are required, and the core layer may be omitted. Yet other parts may employ more than one core layer; the number of core layers may be increased to increase thickness or to employ core layers having different properties (e.g., different structural or insulation properties). In addition, one or more of the core layers may be formed of fiberglass material.

In addition, the primary layer 14 and each of the secondary layers 16 or 18 may be, and typically are, comprised of a plurality of individual panels. Each of the layers 14, 16, and 18 of the exemplary laminate part 12 comprises two panels identified as panels 14a and 14b, 16a and 16b, and 18a and 18b in FIGS. 1B–1I.

The laminate part 12 is fabricated based on a previously created part design. Typically, but not necessarily, the part design is created as a three-dimensional computer model. Based on the part design, a support structure 20 comprising a plurality of support templates 22 is formed; only one of the support templates 22 is represented in FIGS. 1A–G. The support templates 22 are typically, but not necessarily, arranged in a parallel spaced apart arrangement. The characteristics of the laminate part 12 determine the size and shape of, and spacing between, the templates 22.

Figure 1B:
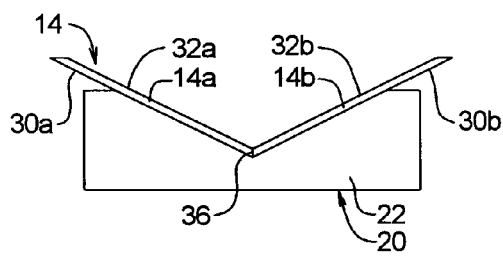

Once the support structure 20 is formed, the outer skin layer 14 is formed as shown in FIG. 1B. To form the exemplary outer skin layer 14, outer surfaces 30a and 30b of the panels 14a and 14b are secured to the templates 22. Typically, liquid adhesives are used to secure the panels 14a,b to the templates 22, but other adhesives may be used as long as they form an adequate bond yet release when desired. Inner surfaces 32a and 32b of the panels 14a and 14b are exposed when the outer skin layer 14 is formed.

Figure 1C:
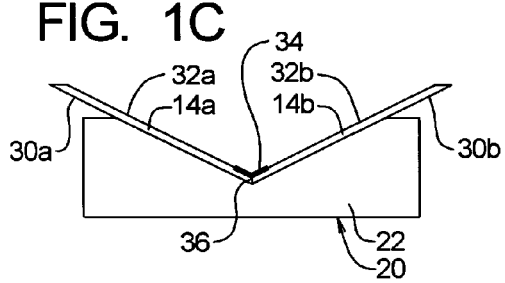

Next, as shown in FIG. 1C, an optional seal 34 is formed along an edge joint 36 between the panels 14a and 14b. The optional seal 34 is used to prevent air flowing through the edge joint 36 during a vacuum bagging step to be described below with reference to FIGS. 1F and 1G. In this case, the seal 34 may simply be formed by tape capable of maintaining an airtight seal under vacuum.

The seal 34 may also structurally reinforce the edge joint 36 when the design of the part 12 requires such reinforcement. When such reinforcement is desired, the seal 34 may be formed by a layer of reinforcement fabric impregnated with resin.

The seal 34 is thus optional in that a laminate part made according to the principles of the present invention may not require reinforcement. In addition, if the primary layer of the laminate part comprises a single panel, no edge joints are formed that require sealing to facilitate the vacuum bagging process described below. In addition, even a laminate part formed of multiple primary layer panels might be vacuum bagged in a manner or sequence that does not require a seal to be formed at the edge joints.

Figure 1D:
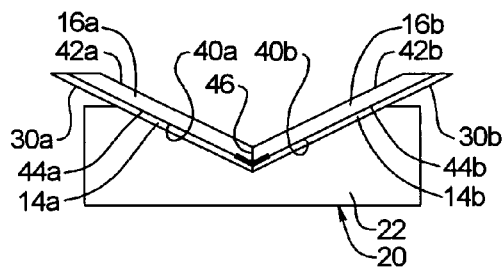

Outer surfaces 40a and 40b of the core panels 16a and 16b are next arranged against the inner surfaces 32a and 32b of the outer skin panels 14a and 14b, respectively, as shown in FIG. 1D. Inner surfaces 42a and 42b of the core panels 16a and 16b are exposed at this point. Face junctures 44a and 44b are formed between the surfaces 32a and 40a and 32b and 40b, respectively. An edge juncture 46 is formed between the core panels 16a and 16b.

Figure 1E:
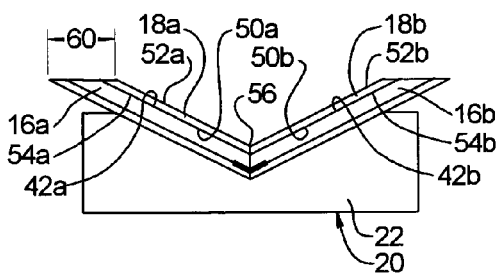

Inner surfaces 50a and 50b of the inner skin panels 18a and 18b are then arranged against the outer surfaces 42a and 42b of the core panels 16a and 16b, respectively, as shown in FIG. 1E. Inner surfaces 52a and 52b of the inner skin panels 18a and 18b are exposed at this point. Face junctures 54a and 54b are formed between the surfaces 42a and 50a and 42b and 50b, respectively. An edge juncture 56 is formed between the skin panels 18a and 18b.

Figure 1F:
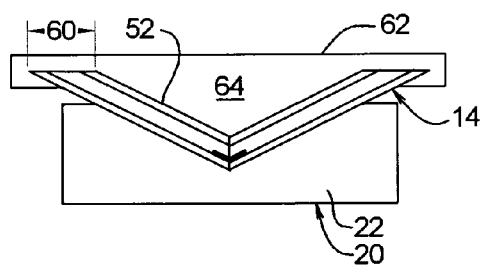
Figure 1G:
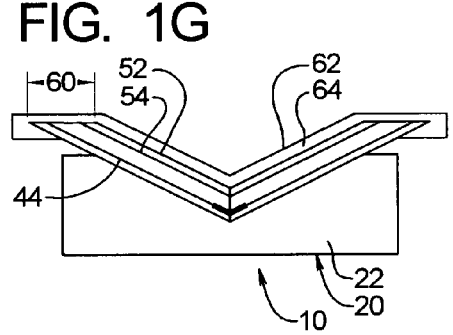

Before the vacuum process depicted in FIGS. 1F and 1G, the combination of the outer skin panels 14a,b, core panels 16a,b, and outer skin panels 18a,b is referred to as a stack; the stack is identified by reference character 60 in FIGS. 1E, 1F, and 1G. The stack 60 may be dry laid (without resin) or wet laid (with resin).

The stack 60 may optionally dry laid to test the fit of the various panels 14a,b, 16a,b, and 18a,b. After it is determined that the panels 14a,b, 16a,b, and 18a,b fit properly, the dry stack would be disassembled and then reassembled with resin applied to the face junctures 44a,b and 54a,b to form the wet stack.

When the stack 60 is wet laid, a vacuum bag 62 is preferably secured to the outer skin panels 14a,b. In particular, the vacuum bag 62 is typically secured by double stick tape to the outer surfaces 30a,b and/or the inner surfaces 32a,b of the outer skin panels 14a,b. Because of the seal 34 formed as described above, the vacuum bag 62 and outer skin panels 14a,b define a sealed vacuum chamber 64 when the vacuum bag 62 is secured to the outer skin panels 14a,b.

Withdrawing air from the vacuum chamber 64 as shown in FIG. 1G causes the vacuum bag 62 to collapse against the inner surface 52 of the inner skin layer 18. The vacuum bag 62 engages the core panels 16a,b and inner skin panels 18a,b to inhibit movement of the panels 16a,b and 18a,b until the resin cures. The vacuum bag 62 thus helps maintain the panels 16a,b and 18a,b substantially in alignment while the resin cures.

The vacuum within the chamber 64 also removes air from the face junctures 44 between the layers 14 and 16 and from the face junctures 54 between the layers 16 and 18; this vacuum further causes resin to flow through the edge juncture 46 between the core panels 16a,b and the edge juncture 56 between the inner skin panels 18a,b. The resin is thus evenly distributed throughout the wet stack 60 before the resin cures. Vacuum bagging the wet stack 60 thus creates a stronger bond between the core panels 16a,b and inner skin panels 18a,b and reduces voids within the finished laminate part 12.

Figure 1H:
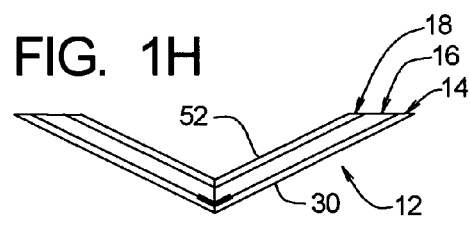

After the resin cures, the vacuum bag 62 is removed from the outer skin layer 14, and the outer skin layer 14 is removed from the templates 22 as shown in FIG. 1H. The outer surface 30 of the outer skin layer 14 is smooth, and the adhesive bond that secures the outer skin panels 14a,b to the templates 22 are easily broken. A small amount of adhesive residue may need to be scraped off of the outer surface 30.

The panels 14a,b and 18a,b described above are fiberglass articles that may be created by any one or a combination of different techniques. In one form of the invention, the laminate article 12 may be fabricated using only panels 14*a,b* and 18*a,b* that are substantially planar, or flat, when manufactured. A part design that may be fabricated using edge joined flat panels is conventionally referred to as having developable surfaces.

Depending upon the characteristics of the panels used, the panels typically can be bent within limits to allow the panels to form a gently curved surface. During the process of creating the stack 60, securing the panels 14*a,b* to the templates 22 maintains the curvature of the panels 14*a,b*. After the resin has cured, the various layers 14, 16, and 18 maintain the curved surfaces of the individual panels, yielding a laminate part 12 having gently curved surface portions and relatively discontinuous surface portions at the edge joints 36 and 56.

In addition, the principles of the present invention may be applied to laminate parts having either purely non-developable surfaces or a combination of developable and non-developable surfaces. For example, one or both of the panels 14*a* and 14*b* may be fabricated using a curved mold. In this case, the panels 14*a* and 14*b* may be joined together using the system 10 described herein to obtain the finished part 12 having at least one non-developable surface portion.

The fabrication system 10 of the present invention thus allows the designer significant flexibility when designing the laminate part 12. The designer may use entirely developable surfaces to obtain a low cost part by using a limited number of flat panels. By decreasing the size and increasing the number of the panels (e.g., using thin strips), the designer can created a laminate part having developable surfaces that approximate a part having non-developable surfaces. The designer may further create a laminate part mostly of developable surfaces, but use molded panels to form non-developable surfaces on a certain portion of the part (e.g., bow or keel) where such surfaces are desirable. In addition, the designer may develop a part consisting entirely of molded panels defining non-developable surfaces.

Using the fabrication system 10, the designer may tailor the design based on cost, timing, and other considerations. For example, a designer may design a relatively low-cost prototype part having all developable surfaces to quickly test the basic viability of the design and then later refine the design using higher cost molded parts having non-developable surfaces.

Even if all of the panels used to fabricate a laminate part are molded, the use of the fabrication process 10 of the present invention may yield an advantage as compared to a process using a traditional male or female mold.

For example, the fabrication process 10 might be commercialized in the context of a design company and an independent panel fabrication company. The design company would design the laminate part based on the needs of the end user. The part fabrication shop would only require relatively inexpensive manufacturing facilities and low cost labor for assembling the panels into finished parts. The panel fabrication company would invest in highly specialized equipment (lay-up tables, CNC machines) for the fabrication of panels and ancillary components such as templates. The panel fabrication company would be optimized solely for the fabrication of panels based on computer models supplied by a number of design companies.

The fabrication system 10 of the present invention thus would optimize the resources of both the design company and the panel fabrication company. The result is lower cost and better service for the end user of the laminate part.

Whether the panels are fabricated on a flat lay-up surface or in a mold, the fiberglass panels 14*a,b* and 18*a,b* can be fabricated using conventional fiberglass techniques. In either case, the exposed surfaces of the finished laminate part are formed by contact with a smooth surface. The smooth lay-up surface in turn yields a laminate part in which only the exposed edge junctures between panels must be finished.

In the case of the laminate part 12, the exposed surfaces 30 and 52 of the inner and outer layers 14 and 18 are substantially finished after the step shown in FIG. 1H. The edge junctures 36 and 56 at these exposed surfaces 30 and 52 may require limited touch-up to fill, sand, and coat these junctures 36 and 56. The labor involved in this touch-up will be minor and can be minimized by carefully forming and laying the individual panels 14*a,b* and 18*a,b*. The majority of the area defined by the surfaces 30 and 52 will require no touch-up work after the step shown in FIG. 1H.

With the foregoing understanding of the basic operation of the present invention, the details of a second exemplary fabrication system 110 will now be described with reference to FIGS. 2–11.

Referring now to FIGS. 2, 3, 6, and 7 of the drawing, generally represented at 110 in those figures is a fabrication system constructed in accordance with, and embodying, the principles of a second embodiment of the present invention. As part of the fabrication system 110, a stack 112 is formed on a support structure 120 as perhaps best shown in FIGS. 6 and 11.

The exemplary support structure 120 comprises a support platform 120 defining a support surface 122. The support platform 120 is illustrated as a table, but the support surface 122 can be formed on the ground, a concrete pad, a building floor, or any other structure capable of supporting the weight of the stack 112 as will be described in further detail below.

Figure 2:
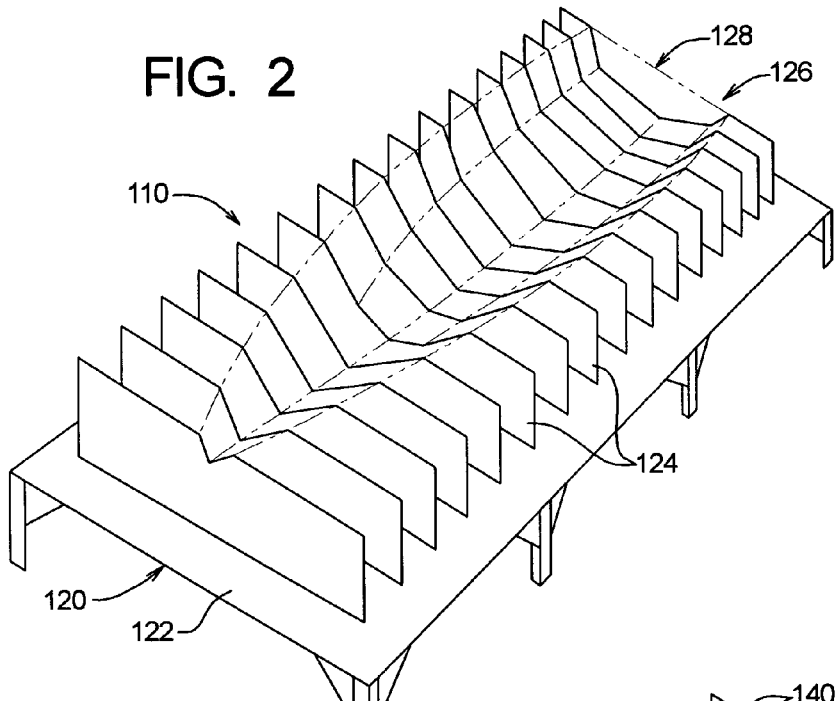
FIG. 2 is a perspective view of a support structure that may be used by a second embodiment of a fabrication system of the present invention.

FIG. 2 also shows that the exemplary support structure 120 comprises a plurality of template members 124 arranged in a template array 126 on the support surface 122. The template array 126 defines a part outline 128 that generally corresponds to a surface of the part that will eventually be formed from the stack 112.

Figure 11:
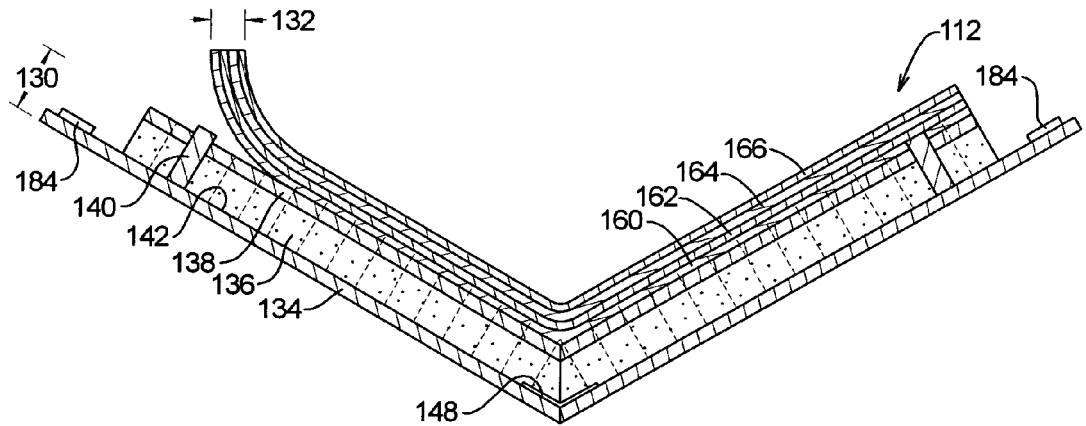
FIG. 11 is an end elevation cut-away view illustrating the removal of a removable portion of the stack of the second embodiment of the present invention.

In particular, the fabrication system 10 is used to form a laminate part 130 (FIG. 11). The size, dimension, and location of the templates 124 are dictated by the design of the laminate part 130 to be manufactured. In particular, the templates 124 correspond to the cross-sectional shape of the laminate part 130 at parallel spaced-apart locations along the part 130.

Typically, but not necessarily, the laminate part 130 may be designed using a three-dimensional computer modeling tool. Such tools allow the designer to create a three-dimensional model of a part and to generate cross-sectional views of the three-dimensional model. The cross-sectional views of the three-dimensional model thus may be used to fabricate the templates 124.

The templates 124 can be cut from plywood or other sheet material using conventional and commonly available techniques. The templates 124 are supported in the array 126 also using conventional and easily available techniques. The support structure 120 thus can be easily manufactured using a pattern and simple cutting tools. However, the templates 124 and can also be manufactured using computer aided manufacturing equipment based on the three-dimensional computer model of the laminate part 130, if used.

As shown in FIG. 11, the stack 112 comprises, and is used to form, the laminate part 130. FIG. 11 also shows that the exemplary stack 112 further comprises a removable portion 132 the composition and purpose of which will be described in further detail below.

FIGS. 6–11 show that the laminate part 130 comprises a primary or outer skin or layer 134 and one or more secondary layers such as a core layer 136 and an inner skin or layer 138.

Figure 3:
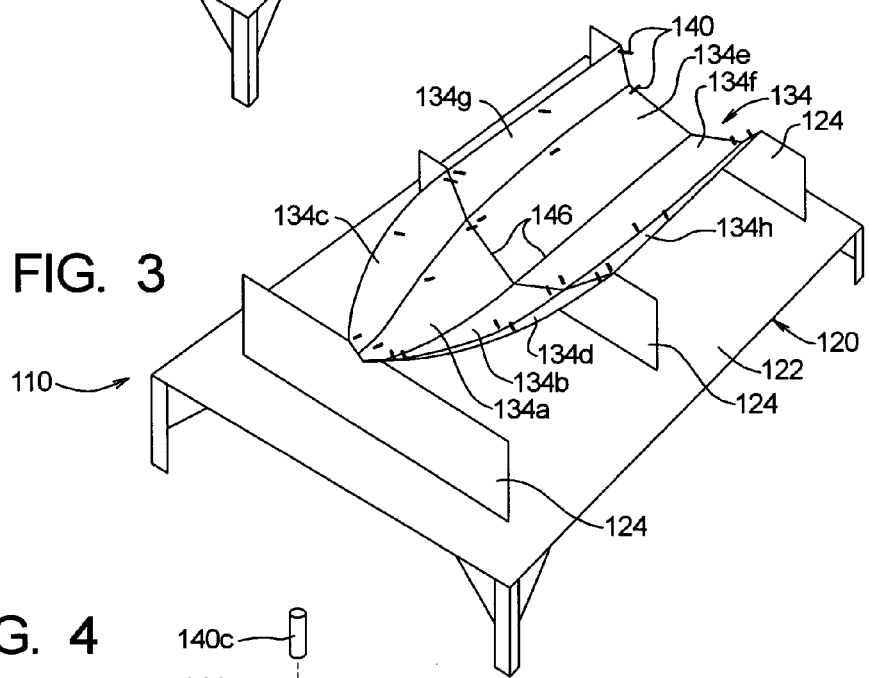
FIG. 3 is a perspective view of a primary or outer skin layer of the stack used by a fabrication system of a second embodiment of the present invention being supported by the support structure of FIG. 2.

As perhaps best shown in FIG. 3, the exemplary outer skin 134 is formed by a plurality of panels 134a–h. These panels 134a–h are supported such that edge joints 146 are formed by adjacent panels. For reasons that will be described in further detail below, some and possibly all of these edge joints 146 may be covered with an airtight seal. While it may be possible simply to use a non-structural seal such as duct tape, strength can be provided to the outer skin 134 by layering fiberglass tape 148 (FIGS. 7 and 8) and impregnating this tape with resin to form a structural seal at the joints 146. In this case, the fiberglass tape 148 may either be a mat or knitted tape depending on the strength requirements of the joint 146.

Referring for a moment to FIGS. 3, 6–9, and 11, the laminate part 130 further comprises locator pegs 140 secured to the outer skin 134. In this exemplary fabrication system 110, the locator pegs 140 are adhered at one or more desired locations 144 on the inner surface 142 of the outer skin 134.

Although the exemplary fabrication system 110 uses glue or other adhesive to secure the locater pegs 140 to the outer skin 134, other systems and methods may be used. For example, the locator pegs 140 may be inserted through or into holes or depressions formed in the outer skin 134 and then bonded to these holes or depressions. As another example, locater pegs having integral clips may be used to secure the locator pegs 140 along the edge of the outer skin 134.

As shown in FIGS. 5–8 and 11, locator holes 150 and 152 are formed in the core 136 and inner skin 138, respectively. As will be described in further detail below, the locator holes 150 and 152 are sized, dimensioned, and located such that these holes 150 and 152 each receive one of the locator pegs 140 described above.

Figure 8:
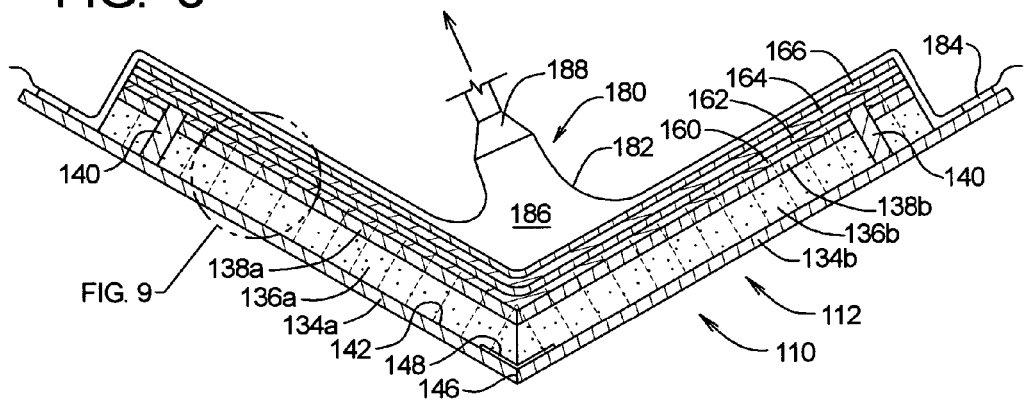
Figure 9:
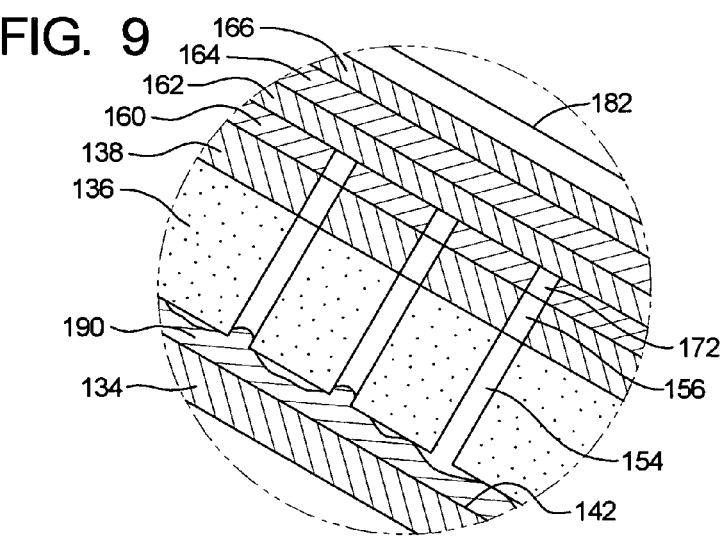
FIGS. 9 and 10 are close up cut-away views of the stack before and after a vacuum is applied to the stack of the second embodiment of the present invention.
Figure 10:
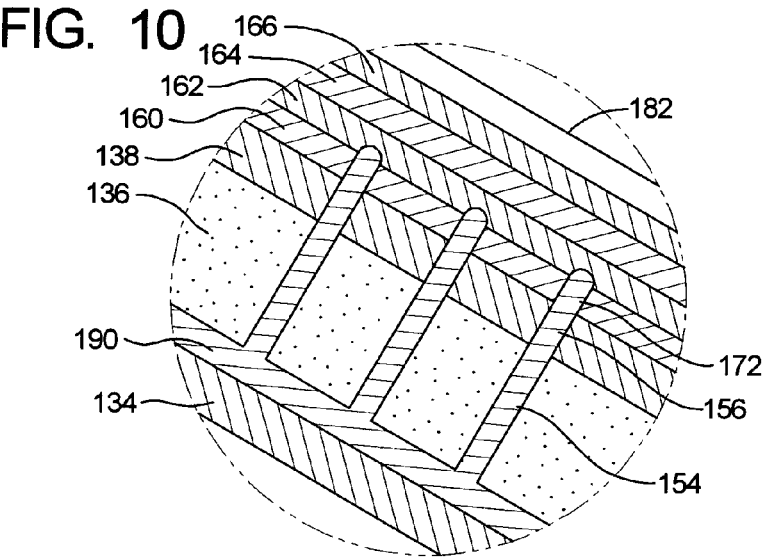

FIGS. 13–8 show that bleeder holes 154 and 156 are formed in the core 136 and inner skin 138, respectively. The bleeder holes 154 and 156 are optional, and the function of the bleeder holes 154 and 156 will be described in further detail below.

Referring now more specifically to FIG. 3, it can be seen that the templates 124 support the eight outer skin panels 134a–h. When the eight outer skin panels 134a–h are joined together, the outer skin 134 is formed as described above. In FIG. 3, only three of the templates 124 are depicted, but it should be understood that the additional templates are omitted for clarity.

Each of the outer skin panels 134a–h can be manufactured on a substantially flat composite lamination table using conventional techniques. The outer skin panels 134a–h are thus flat panels that may be held in a curved configuration when supported by the templates 124. To hold the panels 134a–h in the curved configuration, these panels are adhered to the templates 124. The step of adhering the panels 134a–h to the templates may be omitted, however, if the panels 134a–h do not need to hold a curve. Once secured by adhesives or the like placed on the templates 124, the outer skin panels 134a–h are supported in the shape of the outer surface of the boat hull to be formed by the laminate part 130.

Figure 4:
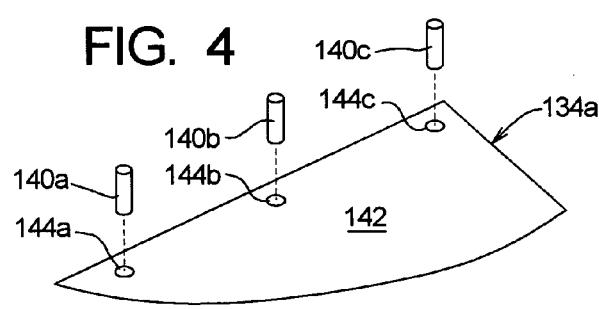
FIG. 4 is a top plan view of an outer skin panel of the stack used by the fabrication system of the present invention.

Turning now to FIG. 4, depicted therein is the panel 134a forming a lower bow portion of the hull formed by the laminate part 130. FIG. 4 illustrates that three pegs 140a–c are adhered at desired locations 144a–c on the inner surface 142 of the outer skin 134. As shown in FIG. 3, the remaining pegs 140 are secured at similar desired locations on the remaining panels 134b–h. The pegs may be glued to the inner surface 142 of the outer skin 134 as shown, may be inserted into holes formed in the outer skin 134, or attached using any other suitable means.

The point in the process at which the pegs 140 are attached to the panels 134a–h can vary depending on the nature of the laminate part 130. These pegs 140 may be applied to the panels 134a–h before assembly of these panels 134a–h into the outer skin 134 and/or after assembly of the outer skin 134. In the system 110, the pegs 140 are secured to the panels 134a–h after these panels 134a–h are secured to the templates 124 for cosmetic reasons.

Figure 5:
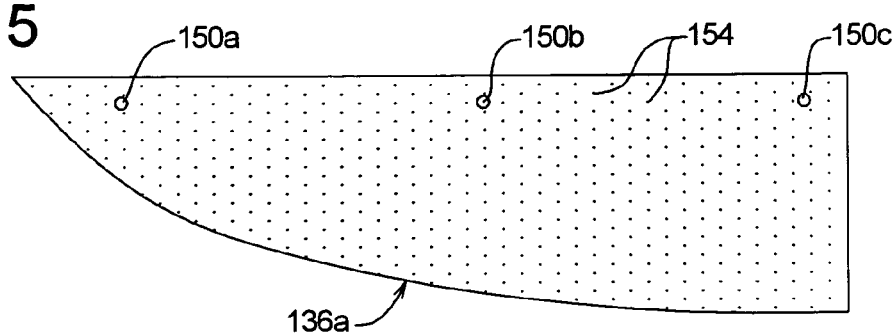
FIG. 5 is a top plan view of a core panel of the stack used by the fabrication system of the present invention.
Figure 7:
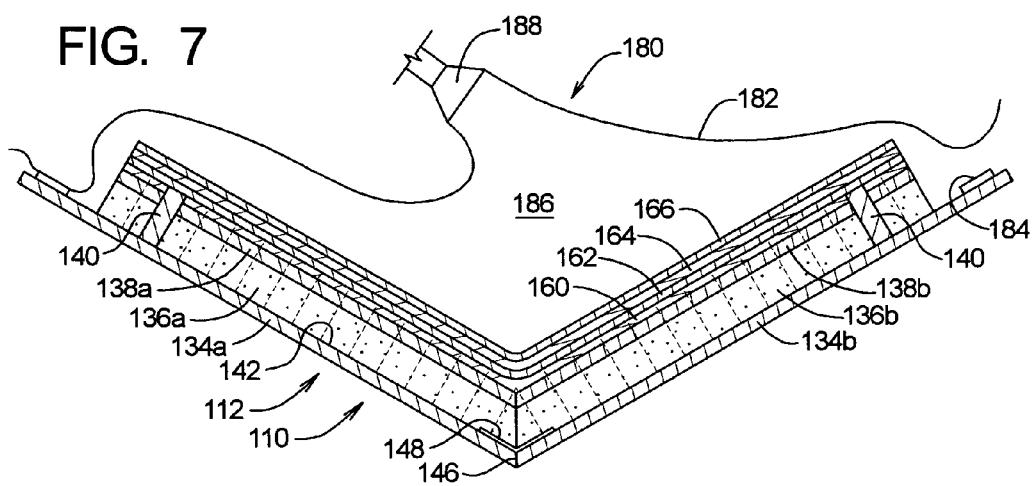
FIGS. 7 and 8 are end elevation cut-away views illustrating the vacuum system used by the second embodiment of the present invention.

The core 136 is formed by arranging a plurality of core panels within the outer skin 134. Not all of the core panels are shown in the drawing, but a core panel 136a is shown in FIGS. 5, 7, and 8 and a core panel 136b is formed as shown in FIGS. 7 and 8. The shape of the core panel 136a (FIG. 5) generally conforms to the shape of the outer skin panel 134a (FIG. 4). In addition, the locator holes 150a, 150b, and 150c on the core panel 136a correspond to the location of the pegs 140a, 140b, and 140c on the outer skin panel 134a.

Accordingly, when the core panel 136a is laid on to the outer skin 134, the locator holes 150a–c are sized, dimensioned, and located to receive the locator pegs 140a–c. The locator pegs thus align the outline of the core panel 136a with the outline of the outer skin panel 134a and support the core panel 136a in a desired relationship with the outer skin panel 134a. The remaining core panels are similarly supported by the locator pegs 140 in desired relationship to the outer skin layer 134.

With the core layer 136 formed as described above, the inner skin layer 138 is next formed. In particular, like the outer skin layer 134 and core layer 136, the inner skin layer 138 is formed by a plurality of inner skin panels that are laid on the core layer 136. And like the core panels, the panels forming the inner skin layer 138 have locator holes 152 formed therein that are sized, dimensioned, and located to receive the locator pegs 140. The locator pegs 140 engage the locator holes 152 such that the inner skin panels are arranged in a desired orientation with respect to the outer skin layer 134 and the core layer 136. From the perspective shown in FIG. 5, the core layer 136 and inner layer 138 look substantially the same.

At this point, the stack 112 comprises the outer skin layer 134, the core layer 136, and the inner skin layer 138. Further, each of these layers 134, 136, and 138 comprises a plurality of individual panels.

Figure 6:
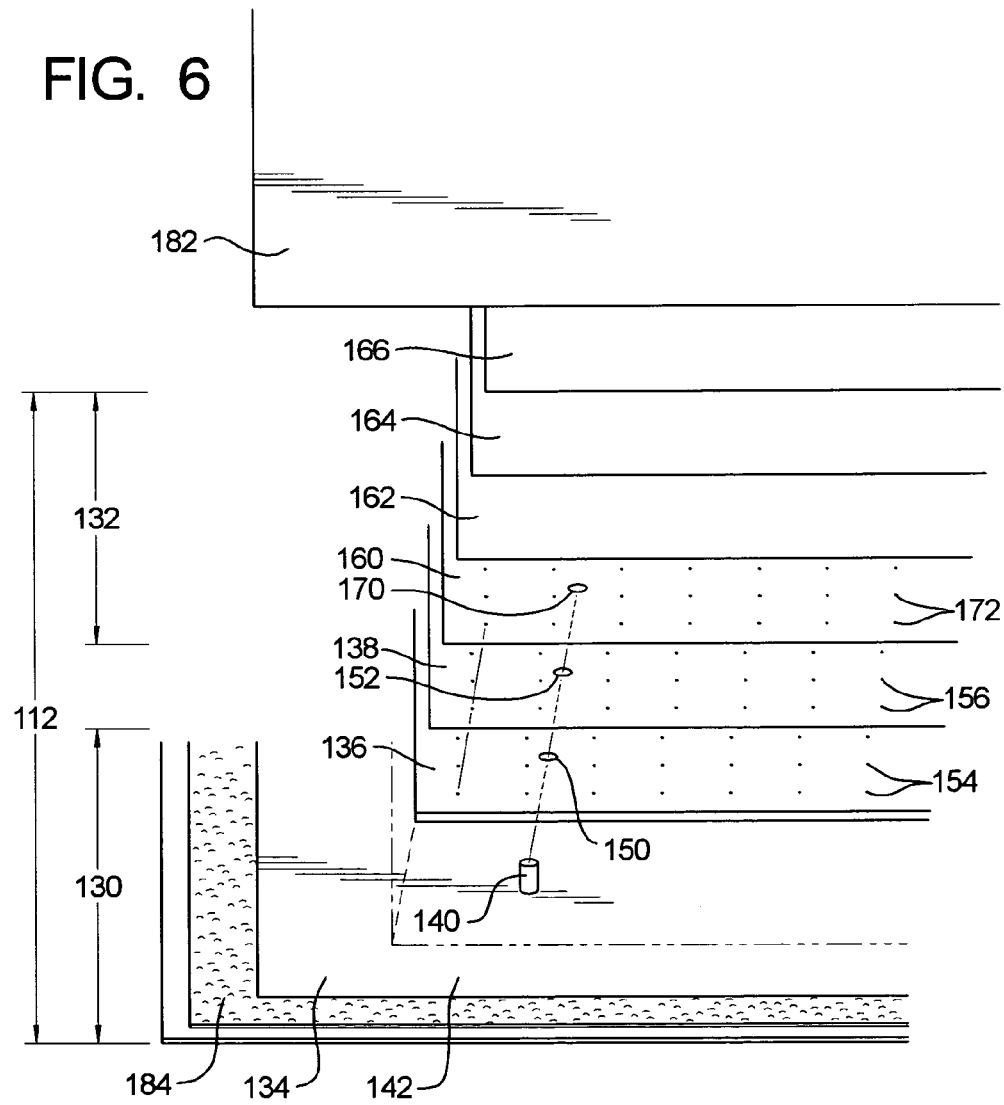
FIG. 6 is an exploded view depicting the layers that are assembled to form the stack used by a first embodiment of a fabrication system of the present invention.

Referring now to FIGS. 6 and 11, these figures show that the removable portion 132 of the stack 112 is formed by a tear sheet 160, first and second bleeder sheets 162 and 164, and a breather sheet 166. As will be described in further detail below, the bleeder sheets 162 and 164 and breather sheet 166 create a pathway that allows air within the stack to be withdrawn.

The tear sheet 160 is made of a material that does not bond with the resin used to form the finish laminate part 130. The tear sheet thus facilitates removal of the removable portion 132 from the finished laminate part 130 as shown in FIG. 11. The exemplary tear sheet 160 comprises tear sheet locator holes 170 that align with the locator pegs 140 extending through the holes 152 in the inner skin 138. The tear sheet 160 further defines optional bleeder holes 172.

The locator holes 150, 152, and 170 in the core 136, inner skin 138, and tear sheet 160 are arranged relative to the bleeder holes 154, 156, and 172 such that these bleeder holes 154, 156, and 172 are substantially aligned when the stack 112 is formed (FIG. 6). The bleeder holes 154, 156, and 172 thus cooperate with the bleeder sheets 162 and 164 and the breather sheet 166 to allow air trapped within the outer skin 134, core 136, and inner skin 138 to be removed from the stack 112.

As perhaps best shown in FIGS. 7 and 8, the fabrication system 110 further comprises a vacuum system 180. The vacuum system comprises a vacuum bag 182 that is sealed to the outer skin 134 using double stick tape 184 to form a vacuum chamber 186. A vacuum port 188 is formed in the vacuum bag 182 to allow the vacuum system 180 to establish a vacuum within the vacuum chamber 186.

The exact location of the double stick tape 184 will be determined by the nature of the laminate part 130. In this case, the outer skin layer 134 is slightly oversized such that it extends beyond the core layer 136 and inner skin layer 138. The double stick tape 184 is arranged, as perhaps best shown in FIGS. 6–8 and 11, such that it extends around the entire periphery of the core layer 136, in the inner skin layer 138, and the sheets 160–166 that form the removable portion 132 of the stack 112. The double stick tape 184 is typically applied with one liner sheet left thereon while the stack 112 is being prepared.

The vacuum bag 182 is next secured to the double stick tape 184 to define the vacuum chamber 186. In particular, the release liner is removed from the double stick tape 184, and the vacuum bag brought into contact with the exposed double stick tape 184 such that vacuum chamber 186 is defined by the vacuum bag 182 and the outer skin layer 134. The sealing of the joints 146 described above maintains the integrity of the vacuum chamber 186.

With the foregoing understanding of the formation of the stack 112 and the vacuum system 180, the method of using the fabrication system 110 will now be described. Initially, the outer skin 134 is formed. The core layer 136 and inner skin layer 138 are then formed using the locator pegs 140 to align and support the core layer 136 and inner skin layer 138 on the outer skin layer 134. At the same time, a hardenable mixture 190 is arranged between the outer skin 134 and the core 136 and, as necessary, between the core 136 and the inner skin layer 138. The removable portion 132 of the stack 112 is then formed by inserting the locator pegs 140 through the tear sheet locator holes 170.

The vacuum bag 182 is then secured to the double stick tape 184 such that the vacuum chamber 186 is formed as shown in FIG. 7. Then, as shown in FIG. 8, the vacuum system 180 is operated to establish a vacuum within the vacuum chamber 186. As shown by a comparison of FIGS. 9 and 10, as the vacuum is formed, substantially all of the air that is trapped either between the outer skin layer 134 and the core layer 136 or between the core layer 136 and the inner skin 138 is removed through the bleeder holes 154, 156, and 172. In this respect, the bleeder sheets 162 and 164 and breather sheet 166 are air permeable such that the vacuum bag 182 does not seal itself against the tear sheet 160 and prevent from flowing out of the entire laminate part 130. The system should be operated such that substantially all of the air within the vacuum chamber 186 is evacuated before the hardenable mixture 190 sets.

Once the hardenable mixture 190 sets, the composite laminate part 130 is formed. The vacuum bag 182 is then removed, and the removable portion 132 of the stack 112 is removed to leave the finished laminate part 130 as shown in FIG. 11. In particular, at this point the templates 124 are removed from the outer skin 134 by wedging, bending, or the like to break the bond therebetween.

At this point, the locator pegs 140 may be trimmed by grinding, sanding, or the like such they are flush with exposed surface of the inner skin 138. Also, edge joints between adjacent panels of the inner and outer layers 134 and 138 may be filled, sanded, and finished as necessary.

In addition, portions or the outer skin 134 may also be trimmed. For example, if the outer skin layer 134 is oversized to allow placement of the double stick tape 184 as shown in FIG. 11, this oversized portion of the outer skin layer 134 may be removed. In addition, a finish such as gel-coat may be applied to the all or a portion of the exposed surfaces of the inner and outer skins 134 and 138 if desired.

Figure 12:
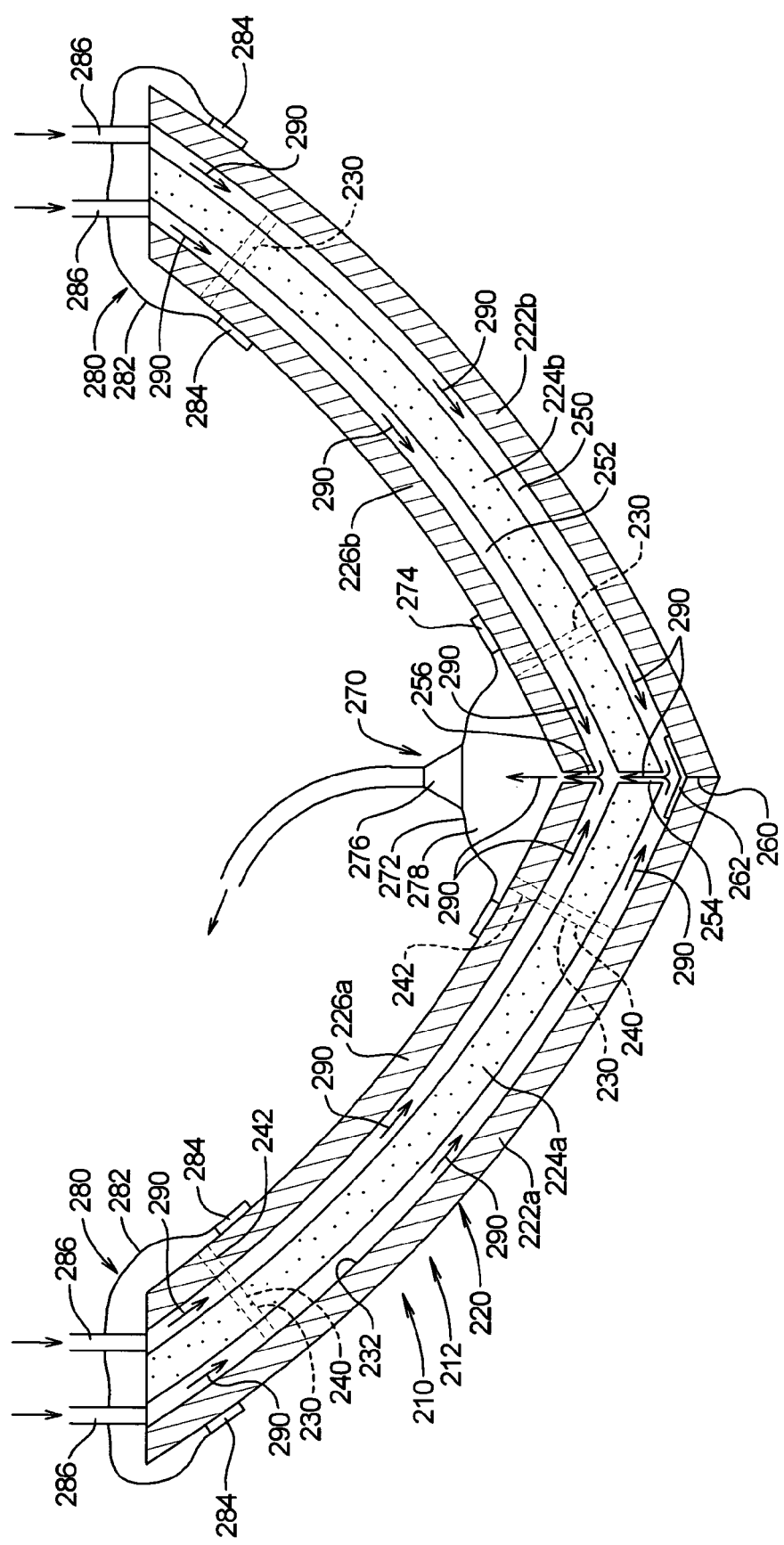
FIG. 12 is a somewhat schematic, end elevation, cut-away view of a third embodiment of the present invention.

Referring now to FIGS. 12 and 13, depicted therein are third and fourth embodiments of fabrication systems constructed in accordance with the principles of the present invention. These embodiments disclose the use of the present invention in the context of a resin infusion process. The resin infusion process is well-known and will not be described herein in detail.

In particular, FIG. 12 depicts a third exemplary embodiment of a fabrication system 210. The fabrication system 210 employs a stack 212 to fabricate a laminate part 220. FIG. 12 is somewhat schematic in that gaps and channels formed by the stack 212 as described below are exaggerated.

The laminate part 220 comprises an outer skin 222, a core 224, and an inner skin 226. Locator pegs 230 extend from an inner surface 232 of the outer skin 222. As described above, the locator pegs 230 may be glued to the surface 232 or otherwise attached to the outer skin 222. Locator holes 240 and 242 are formed in the core layer 224 and inner skin layer 226.

Outer channels 250 are formed between the core layer 224 and the outer skin 222, and inner channels 252 are formed between the core layer 224 and the inner skin 226. The outer channels 250 and inner channel 252 can be formed in several ways. First, a permeable breather sheet can be arranged on both sides of the core layer 224 between the core layer 224 and the outer skin layer 222 and inner skin layer 226. Alternatively, the outer and inner channels 250 and 252 may be formed by texturing, forming grooves, or other physical change to the surface of the core panels 224. The purpose of the channels 250 and 252 is to allow a hardenable liquid to flow through the stack 212.

A core gap 254 is formed where adjacent core panels 224a and 224b meet, and an inner skin gap 256 is formed where inner skin panels 226a and 226b meet. Bleeder holes may also be formed in the core layer 224 and inner skin layer 226, but the channels 250 and 252 and gaps 254 and 256 may obviate the need for bleeder holes. Joints 260 between the outer skin panels 222a and 222b may be sealed by, for example, using fiberglass tape 262 impregnated with resin.

A vacuum system 270 is formed by a vacuum bag 272. The vacuum bag 272 is sealed to the inner skin layer 226 using double stick tape 274. A vacuum port 276 is formed in the vacuum bag 272 to allow access to a vacuum chamber 278.

The fabrication system 210 further comprises a resin supply system 280. The exemplary resin supply system 280 comprises one or more additional vacuum bags 282 secured by double stick tape 284 over the edge of the laminate part 220 to maintain a vacuum within the outer and inner channels 250 and 252. Resin supply ports 286 extend through the vacuum bags 282 to allow a hardenable substance to flow into the channels 250 and 252.

Establishing a vacuum within the vacuum chamber 278 and introducing a resin through the resin supply ports 286 creates flow paths 290 for the hardenable substance introduced through the supply ports 286. In addition, the vacuum within the chamber 278 will remove air trapped between the core and the outer and inner skins 222 and 226 and evenly distribute or disperse the resin in the channels 250 and 252 formed in the face junctures on either side of the core layer 224. After the hardenable substance has set, the vacuum system 270 and resin supply system 280 may be removed leaving the laminate part 220.

Referring now to FIG. 13, depicted therein is yet another exemplary embodiment of a fabrication system 310 of the present invention. The fabrication system 310 uses a stack 312 to form a laminate part 320. The laminate part 320 comprises an outer skin 322, a core 324, and an inner skin 326.

As with the embodiments 110 and 210 described above, locator pegs 330 are arranged in desired locations on the inner surface 332 of the outer skin 322. Similarly, locator holes 340 and 342 are formed in the core 324 and the inner skin 326, respectively. As with the system 210, outer and inner channels 350 and 352 are formed on each side of the core 324 between the core 324 and the outer and inner skins 322 and 326. A core gap 354 is formed between adjacent core panels 324a and 324b, while an inner skin gap 356 is formed between adjacent inner skin panels 326a and 326b. Joints 360 formed between panels forming the outer skin layer 322 are sealed with tape 362 as generally described above.

The fabrication system 310 further comprises a vacuum system 370 comprising a vacuum bag 372 and double stick tape 374. The vacuum bag defines a vacuum port 376, and the double stick tape 374 seals the vacuum bag 372 to the outer skin 322 to define a vacuum chamber 378.

The exemplary fabrication system 310 comprises a resin supply system 380 comprising a plurality of resin supply ports 382. The resin supply ports 382 extend through the vacuum bag 372 and allow a hardenable substance to flow into the outer and inner channels 350 and 352. Accordingly, establishing a vacuum within the vacuum chamber causes a hardenable substance such as resin to flow along flow paths 390 such that air is removed from the channels 350 and 352 and resin is substantially evenly dispersed within these channels 350 and 352.

The present invention may be embodied in ways other than those described above. The scope of the present invention should thus be determined by the following claims and not the foregoing detailed description of the invention.

I claim:

1. A method of fabricating a laminate article, comprising the steps of:
   providing a plurality of support templates;
   arranging the support template to define at least a portion of a part outline corresponding to the laminate article;
   providing a plurality of substantially flat, substantially rigid primary panels each defining an outer surface and an inner surface;
   securing the outer surfaces of the at least some of the plurality of primary panels to at least some of the plurality of templates such that the primary panels conform at least in part to the part outline;
   arranging at least one substantially flat secondary panel on the inner surfaces of the primary panels in a desired relationship with the primary panel;
   securing a vacuum bag to the at least one primary panel to define a vacuum chamber; and
   applying a vacuum to the vacuum chamber to remove air from between the at least one primary panel and the at least one secondary panel and thereby disperse hardenable material between the primary panel and the secondary panel;
   hardening the hardenable material such that the laminate article comprises the plurality of primary panels, the at least one secondary panel, and the hardenable material;
   detaching the plurality of templates from the at least one primary panel, where the outer surfaces of the plurality of primary panels form at least a portion of a finished surface of the laminate article.

2. A method as recited in claim 1, in which the plurality of primary panels define a primary layer of the laminate article.

3. A method as recited in claim 2, in which at least two of the primary panels abut each other to define an edge joint, the method further comprising the step of sealing the edge joint.

4. A method as recited in claim 1, in which the plurality of primary panels are first skin panels, where the step of arranging the at least one secondary panel on the inner surface of the plurality of primary panel comprises the steps of:
   providing a plurality of core panels each defining first and second surfaces;
   arranging the first surfaces of the core panels against the inner surfaces of the primary panels;
   providing a plurality of second skin panels each defining an inner surface and an outer surface; and
   arranging the inner surfaces of the second skin panels against the second surfaces of the core panels.

5. A method as recited in claim 1, in which the step of arranging at least one secondary panel on the inner surface of the primary panel in a desired relationship with the primary panel comprises the steps of:
   securing at least one locater peg to the primary panel; and
   forming at least one locater hole in the at least one secondary panel; and
   displacing the at least one secondary panel such that the at least one locater hole receives a corresponding locater peg.

6. A method as recited in claim 4, in which the step of arranging the plurality of secondary panels on the inner surfaces of the primary panels in a desired relationship with the primary panels comprises the steps of:
   securing at least one locater peg to the primary panel; and
   forming at least one locater hole in the at least one core panel;
   forming at least one locater hole in the at least one second skin panel; and
   displacing the at least one core panel and the at least one second skin panel such that the locater holes therein receive a corresponding locater peg.

7. A method as recited in claim 5, further comprising the step of forming bleeder holes in the at least one secondary panel.

8. A method as recited in claim 6, further comprising the step of forming bleeder holes in the at least one core panel and the at least one second skin panel.

9. A method as recited in claim 1, further comprising the steps of:
   forming channels between the at least one core panel and the first and second skin panels; and
   causing resin to flow through the channels.

10. A method of fabricating a laminate article, comprising the steps of:
 providing a support structure defining at least a portion of a part outline;
 providing a plurality of substantially flat, substantially rigid primary panels;
 supporting at least some of the primary panels on the support structure to form a primary layer defining an inner surface and an outer surface, where the primary layer conforms to at least a portion of the part outline;
 providing at least one locater peg;
 securing the at least one locater peg to the inner surface of the primary layer;
 providing at least one substantially flat secondary panel;
 forming at least one locater hole in the at least one secondary panel;
 forming at least one secondary layer by displacing the at least one secondary panel relative to the primary layer such that the at least one locater peg enters the at least one locater hole;
 applying a vacuum to the primary layer and the secondary layer such that air is withdrawn from between the primary layer and the secondary layer, and hardenable material is dispersed between the primary layer and the secondary layer; and
 hardening the hardenable material such that
  the laminate article comprises the primary layer, the secondary layer, and the hardenable material, and
  the outer surface of the primary layer forms at least a portion of a finished surface of the laminate article.

11. A method as recited in claim 10, in which:
 the step of forming at least one secondary layer comprises the step of forming a plurality of secondary layers;
 the step of displacing the at least one secondary panel relative to the primary layer further comprises the steps of displacing a plurality of secondary panels relative to the at least one primary layer such that the at least one locater peg enters the at least one locater hole formed in each of the plurality of secondary panels; whereby
 the vacuum withdraws air from between the primary layer the plurality of secondary layers, and
 the vacuum disperses the hardenable material between the primary layer and the plurality of secondary layers.

12. A method as recited in claim 11, in which at least one of the plurality of secondary layers is arranged at least partly between the primary layer and another of the secondary layers.

13. A method as recited in claim 10, in which:
 the step of providing at least one secondary panel comprises the steps of providing first and second secondary panels; and
  forming at least one locater hole in each of the first and second secondary panels;
 the step of displacing the at least one secondary panel relative to the primary panel further comprises the steps of displacing the first and second secondary panels relative to the primary panel such that the at least one locater peg enters the at least one locater hole formed in each of the first and second secondary panels; whereby
 the vacuum withdraws air from between the primary panel and the first secondary panel and between the first secondary panel and the second secondary panel, and
 the vacuum disperses the hardenable material between the primary panel and the first secondary panel and between the first secondary panel and the second secondary panel.

14. A method as recited in claim 13, in which:
 the primary panels are fiberglass panels;
 the first secondary panel is a core panel; and
 the second secondary panel is a fiberglass panel.

15. A method as recited in claim 10, in which:
 the step of providing the at least one locater peg comprises the step of providing a plurality of locater pegs;
 the step of securing the at least one locater peg to the primary panel comprises the step of securing the plurality of locater pegs to the primary panel;
 the step of providing at least one secondary panel comprises the steps of providing a plurality of secondary panels; and
  forming at least one locater hole in each of the plurality of secondary panels;
 the step of displacing the at least one secondary panel relative to the primary layer further comprises the steps of displacing the plurality of secondary panels relative to the primary panel such that one locater peg enters the at least one locater hole formed in each of the plurality of secondary panels.

16. A method as recited in claim 15, in which at least two of the plurality of secondary panels are in contact with the primary panel and define a secondary panel juncture.

17. A method as recited in claim 10, in which:
 at least two primary panels are provided; and
 the at least two primary panels define at least one primary edge juncture.

18. A method as recited in claim 17, further comprising the step of sealing the primary edge juncture.

19. A method as recited in claim 10, in which:
 at least two secondary panels are provided; and
 the at least two secondary panels define a secondary edge juncture.

20. A method as recited in claim 18, in which:
 at least two secondary panels are provided; and
 the at least two secondary panels define a secondary edge juncture.

21. A method as recited in claim 10, in which:
 at least two secondary panels are provided; and
 the at least two secondary panels define a secondary face juncture.

22. A method as recited in claim 10, further comprising the steps of:
 providing a plurality of templates;
 arranging the templates to form the support structure; and
 supporting the plurality of primary panels on the support structure to form an outer skin that substantially follows the part outline.

23. A method as recited in claim 22, in which the step of providing the support structure comprises the steps of:
 providing a plurality of template members; and
 arranging the template members in a template array.

24. A method as recited in claim 10, in which:
 at least two secondary panels of a first type are provided;
 at least two secondary panels of a second type are provided;
 the plurality of primary panels are arranged to define an outer skin layer;
 the at least two secondary panels of the first type are arranged to define core layer;
 the at least two secondary panels of the second type are arranged to define an inner skin layer, where the core layer is arranged between the outer skin layer and the inner skin layer.

25. A method as recited in claim 24, further comprising the steps of: providing a release sheet; and
arranging the release sheet on the inner skin layer.

26. A method as recited in claim 25, further comprising the steps of:
providing at least one bleeder sheet; and
arranging the at least one bleeder sheet on the at least one release sheet.

27. A method as recited in claim 26, further comprising the steps of:
providing a plurality of release sheets;
providing at least one breather sheet; and
arranging the at least one breather sheet on one of the plurality of release sheets.

28. A method as recited in claim 10, further comprising the step of:
forming a plurality of bleeder holes in the at least one secondary panel; where
the step of applying a vacuum between the primary layer and the secondary layer further comprises the steps of withdrawing air from the bleeder holes and forcing hardenable material into the bleeder holes.

29. A method as recited in claim 24, further comprising the step of:
forming a plurality of bleeder holes in the secondary panels forming the core layer and the inner skin layer; where
the step of applying a vacuum between the primary panel and the secondary panel further comprises the steps of withdrawing air from the bleeder holes and forcing hardenable material into the bleeder holes.

30. A method as recited in claim 29, in which the at least one locater peg is secured to the inner surface of the primary panel such that the bleeder holes in the secondary panels forming the core layer and inner skin layer are substantially aligned.

31. A method as recited in claim 30, further comprising the steps of:
providing a release sheet;
forming a plurality of bleeder holes in the release sheet; and
arranging the release sheet on the inner skin layer such that the bleeder holes in the release sheet are substantially aligned with the bleeder holes in the inner skin layer.

32. A method as recited in claim 10, further comprising the step of applying hardenable material to the inner surface of the at least one primary panel.

33. A method as recited in claim 10, further comprising the step of introducing hardenable material between the primary panel and the at least one secondary panel.

34. A method as recited in claim 10, in which the step of applying a vacuum between the primary panel and the secondary panel comprises the steps of:
providing a vacuum bag; and
sealing the vacuum bag to at least one of the primary panel and the secondary panel to prevent air outside the vacuum bag from flowing between the primary panel and the secondary panel.

* * * * *